US008843582B2

(12) United States Patent
Wilhelm

(10) Patent No.: US 8,843,582 B2
(45) Date of Patent: Sep. 23, 2014

(54) METHOD AND SYSTEM FOR SEARCHING AND PROCESSING CONTACTS

(75) Inventor: Albert P. Wilhelm, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1477 days.

(21) Appl. No.: 11/304,965

(22) Filed: Dec. 15, 2005

(65) Prior Publication Data

US 2007/0143500 A1 Jun. 21, 2007

(51) Int. Cl.
G06F 15/16 (2006.01)
G06F 15/167 (2006.01)
H04M 3/42 (2006.01)
H04M 1/2745 (2006.01)
H04M 3/493 (2006.01)
H04M 7/00 (2006.01)

(52) U.S. Cl.
CPC ...... *H04M 1/274516* (2013.01); *H04M 3/4228* (2013.01); *H04M 3/4931* (2013.01); *H04M 7/006* (2013.01)
USPC .......... 709/213; 709/203; 709/216; 709/217; 709/219

(58) Field of Classification Search
CPC ............................................. H04M 1/274533
USPC .................. 709/213, 217, 227, 203, 216, 219
See application file for complete search history.

(56) References Cited

U.S. PATENT DOCUMENTS

| 5,400,390 | A | * | 3/1995 | Salin | 455/433 |
| 5,671,285 | A | * | 9/1997 | Newman | 705/78 |
| 5,852,657 | A | * | 12/1998 | Malik et al. | 379/93.25 |
| 6,038,451 | A | * | 3/2000 | Syed et al. | 455/445 |
| 6,115,617 | A | * | 9/2000 | Ib | 455/564 |
| 6,463,443 | B1 | * | 10/2002 | Thorner et al. | 1/1 |
| 6,718,030 | B1 | * | 4/2004 | Turner et al. | 379/221.02 |
| 6,810,405 | B1 | | 10/2004 | LaRue et al. | |
| 6,950,652 | B2 | * | 9/2005 | Janssen et al. | 455/419 |
| 6,993,360 | B2 | * | 1/2006 | Plahte et al. | 455/555 |
| 7,085,257 | B1 | * | 8/2006 | Karves et al. | 370/352 |
| 7,096,009 | B2 | * | 8/2006 | Mousseau et al. | 455/415 |
| 7,200,413 | B2 | * | 4/2007 | Montemer et al. | 455/466 |
| 7,295,836 | B2 | * | 11/2007 | Yach et al. | 455/415 |
| 7,340,048 | B2 | * | 3/2008 | Stern et al. | 379/218.01 |
| 7,340,262 | B1 | * | 3/2008 | Gillespie et al. | 455/456.3 |

(Continued)

OTHER PUBLICATIONS

Loryman et al. "The Cameleon VAB service enabled by a FIPA Agent platform," 2nd International Acts Workshop, (Sep. 1999), pp. 1-13.*

*Primary Examiner* — Joseph Greene
*Assistant Examiner* — Angela Widhalm
(74) *Attorney, Agent, or Firm* — Guntin & Gust, PLC; Joseph Hrutka

(57) ABSTRACT

A system and method are disclosed for searching and processing contacts. A system that incorporates teachings of the present disclosure may include, for example, a mobile communication device (MCD) (116) has a transceiver (202), and a controller (212) for controlling operations thereof. The controller is programmed to receive (302) from an end user of the MCD a request for a contact, and search (304) for the contact in a phonebook of the MCD. If the entry cannot be found in the MCD, the controller is programmed to search (318) for the contact in a phonebook of a local communication device (LCD). If the contact cannot be found in the LCD, the controller is programmed to search (330) for the contact in a directory of an enterprise server. Additional embodiments are also disclosed.

19 Claims, 4 Drawing Sheets

(56) References Cited

U.S. PATENT DOCUMENTS

| | | | |
|---|---|---|---|
| 7,362,854 B2* | 4/2008 | Mcknight | 379/210.01 |
| 7,385,992 B1* | 6/2008 | Koch et al. | 370/401 |
| 7,466,810 B1* | 12/2008 | Quon et al. | 379/201.01 |
| 7,706,401 B2* | 4/2010 | Bae et al. | 370/466 |
| 7,751,415 B2* | 7/2010 | Bos et al. | 370/410 |
| 7,839,987 B1* | 11/2010 | Kirchhoff et al. | 379/142.02 |
| 2002/0010736 A1* | 1/2002 | Marques et al. | 709/201 |
| 2002/0019225 A1* | 2/2002 | Miyashita | 455/412 |
| 2002/0138470 A1* | 9/2002 | Zhou | 707/3 |
| 2002/0174188 A1 | 11/2002 | Clark et al. | |
| 2002/0181681 A1* | 12/2002 | Mani | 379/142.03 |
| 2003/0108172 A1* | 6/2003 | Petty et al. | 379/142.08 |
| 2003/0134648 A1* | 7/2003 | Reed et al. | 455/456 |
| 2003/0193696 A1* | 10/2003 | Walker et al. | 358/402 |
| 2004/0192340 A1* | 9/2004 | Brem et al. | 455/456.1 |
| 2004/0199643 A1* | 10/2004 | Thompson et al. | 709/227 |
| 2004/0203642 A1* | 10/2004 | Zatloukal et al. | 455/414.1 |
| 2004/0220907 A1* | 11/2004 | Camarillo | 707/3 |
| 2004/0249951 A1* | 12/2004 | Grabelsky et al. | 709/227 |
| 2005/0102368 A1* | 5/2005 | Forman et al. | 709/207 |
| 2005/0192944 A1* | 9/2005 | Flinchem | 707/3 |
| 2006/0025113 A1* | 2/2006 | Nguyen et al. | 455/412.1 |
| 2006/0133306 A1* | 6/2006 | Neuhaus et al. | 370/315 |
| 2006/0135157 A1* | 6/2006 | Baek et al. | 455/433 |
| 2006/0165106 A1* | 7/2006 | Nishiki et al. | 370/401 |
| 2006/0204821 A1* | 9/2006 | Blanchet et al. | 429/34 |
| 2006/0218111 A1* | 9/2006 | Cohen | 706/45 |
| 2007/0041571 A1* | 2/2007 | Chatterjee et al. | 379/355.02 |
| 2007/0097879 A1* | 5/2007 | Bleckert et al. | 370/254 |
| 2007/0111711 A1* | 5/2007 | Ratnakar | 455/414.1 |
| 2007/0276799 A1* | 11/2007 | Kalervo et al. | 707/3 |
| 2008/0222127 A1* | 9/2008 | Bergin | 707/5 |
| 2008/0280617 A1* | 11/2008 | Aguilar et al. | 455/445 |

* cited by examiner

METHOD AND SYSTEM FOR SEARCHING AND PROCESSING CONTACTS

RELATED APPLICATIONS

U.S. patent application filed Sep. 14, 2005, by Doradla et al., Ser. No. 11/226,583, entitled "Method and System to Proxy Mobile and Network Originated Call Sessions." All sections of the aforementioned application are incorporated herein by reference.

U.S. patent application filed Oct. 5, 2005, by Gewecke, Ser. No. 11/244,449, entitled "Method and System to Proxy Phone Directories." All sections of the aforementioned application are incorporated herein by reference.

FIELD OF THE DISCLOSURE

The present disclosure relates generally to communication systems and more specifically to a method and system for searching and processing contacts.

BACKGROUND

It is not unusual for business executives to spend considerable amounts of time traveling with a need to be in contact with their companies. These executives generally access phonebook information from disparate sources such as mobile phones, PDAs (Personal Digital Assistants), and/or corporate directories. Any effort that eases the experience in favor of greater integration between these disparate technologies is desirable.

DETAILED DESCRIPTION

Embodiments in accordance with the present disclosure provide a method and system for searching and processing contacts.

In a first embodiment of the present disclosure, a mobile communication device (MCD) has a transceiver, and a controller for controlling operations thereof. The controller is programmed to receive from an end user of the MCD a request for a contact, and search for the contact in a phonebook of the MCD. If the entry cannot be found in the MCD, the controller is programmed to search for the contact in a phonebook of a local communication device (LCD). If the contact cannot be found in the LCD, the controller is programmed to search for the contact in a directory of an enterprise server.

In a second embodiment of the present disclosure, a computer-readable storage medium operates in a mobile communication device (MCD). The storage medium includes computer instructions for searching a contact in a phonebook of the MCD responsive to a request from an end user of the MCD. If the entry cannot be found in the phonebook of the MCD, the storage medium includes computer instructions for scanning for one or more local communication devices (LCDs), searching the contact in a phonebook of each of the detected LCDs, finding the contact in at least one of the detected LCDs, and retrieving the contact from the at least one detected LCDs. If the contact cannot be found in the LCDs, the storage medium includes computer instructions for scanning for requesting service from a phone directory proxy server (PDPS), and retrieving the contact from the PDPS.

In a third embodiment of the present disclosure, a method has the steps of searching a contact in a phonebook of the MCD. If the entry cannot be found in the phonebook of the MCD, the method includes the steps of scanning for one or more local communication devices (LCDs), searching the contact in a phonebook of each of the detected LCDs, finding the contact in at least one of the detected LCDs, and retrieving the contact from the at least one detected LCDs. If the contact cannot be found in the LCDs, the method further includes the steps of contacting a phone directory proxy server (PDPS), searching the contact in a directory of the PDPS, finding the contact in the directory, and retrieving the contact from the directory. The method further includes the step of transmitting a mobile originated call corresponding to the contact retrieved from one among the MCD, the LCDs and the PDPS.

Figure 1:
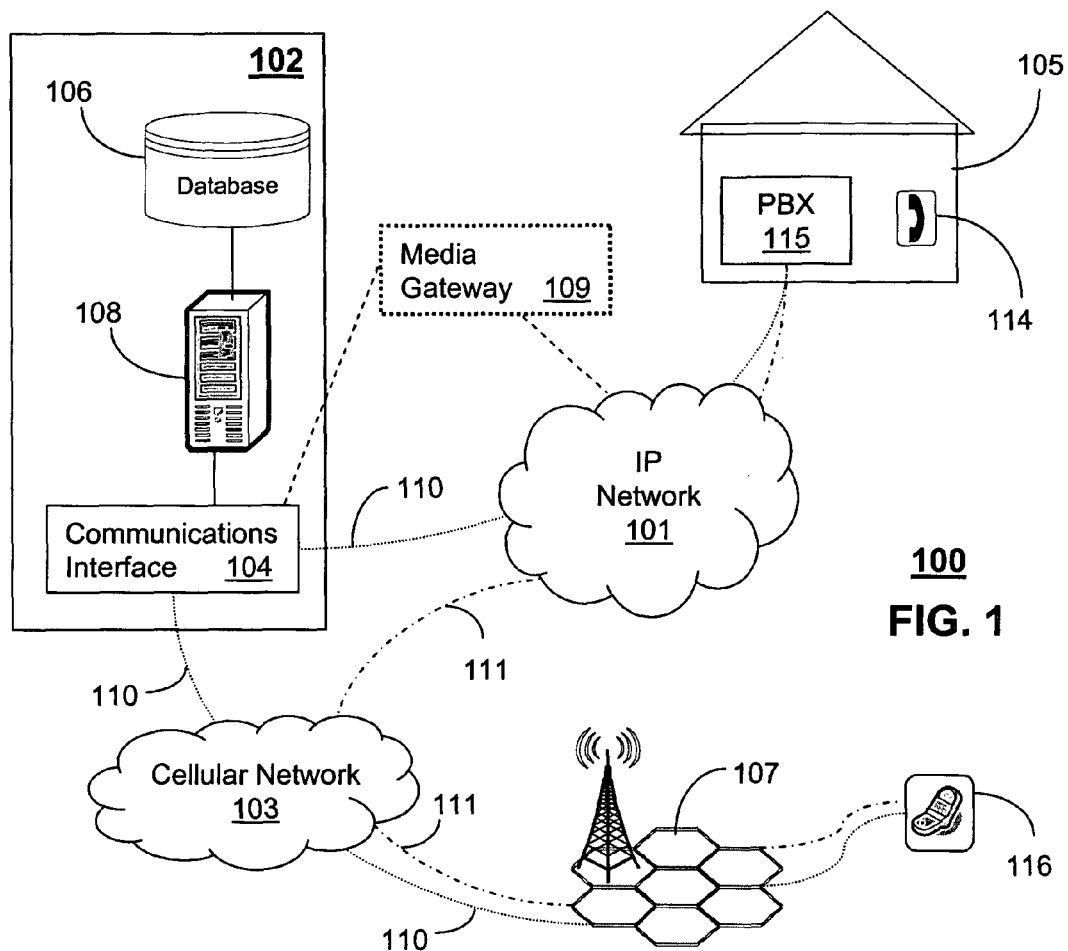
FIG. 1 is a block diagram of a communication system incorporating teachings of the present disclosure.

FIG. 1 is a block diagram of a communication system 100 incorporating teachings of the present disclosure. The communication system 100 comprises an IP (Internet Protocol) network 101 coupled to an enterprise server such as a phone directory proxy server (PDPS) 102, a cellular network 103 and an enterprise 105. The IP network 101 utilizes technology for transporting Internet traffic. The enterprise 105 can include a PBX 115 that provides connectivity services such as abbreviated dialing (e.g., 5-digit dialing) between terminal devices 114 (such as a Voice over IP phone) of enterprise personnel. Alternatively, the enterprise 105 can be coupled to a Centrex controllable by the PDPS 102 as described below for supporting similar services as the PBX 115. In yet another alternative embodiment, the enterprise 105 can represent a directory service such as the white pages, "411" or "XXX-555-1212".

It will be appreciated by an artisan with ordinary skill in the art that the present disclosure and claims described below are not limited to an enterprise setting. That is, the PDPS 102 can operate in a non-commercial setting such as for residential consumers or other non-commercial users who seek a similar experience as described herein. For illustration purposes only, the present disclosure focuses on the enterprise setting. However, it would be apparent to said artisan that the claims described below can be applied to a non-commercial setting as well.

The PDPS 102 comprises a communications interface 104 that utilizes common technology for communicating over an IP interface with the IP network 101, a media gateway 109, and/or the cellular network 103. The PDPS 102 further comprises a memory 106 (such as a high capacity storage medium) embodied in this illustration as a database, and a controller 108 that makes use of computing technology such as a desktop computer, or scalable server for controlling operations of the PDPS 102. The PDPS 102 can operate as an IP Multimedia Subsystem (IMS) conforming in part to protocols defined by standards bodies such as 3GPP (Third Generation Partnership Protocol).

Under the control of the PDPS 102, the media gateway 109 can link packet-switched and circuit-switched technologies such as the cellular network 103 and the IP network 101, respectively. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication between the media gateway 109, which converts data from the format required for a circuit-switched network to that required for a packet-switched network. MGCP can therefore be used to set up, maintain, and terminate calls between multiple disparate communication elements.

The cellular network 103 utilizes circuit-switched technology supporting voice and data services such as GSM-GPRS, EDGE, CDMA-1X, EVDO, UMTS, and other known technologies. The cellular network 103 is coupled to base stations 107 under a frequency-reuse environment for communicating over-the-air with roaming mobile communication devices (MCDs) 116.

Figure 2:
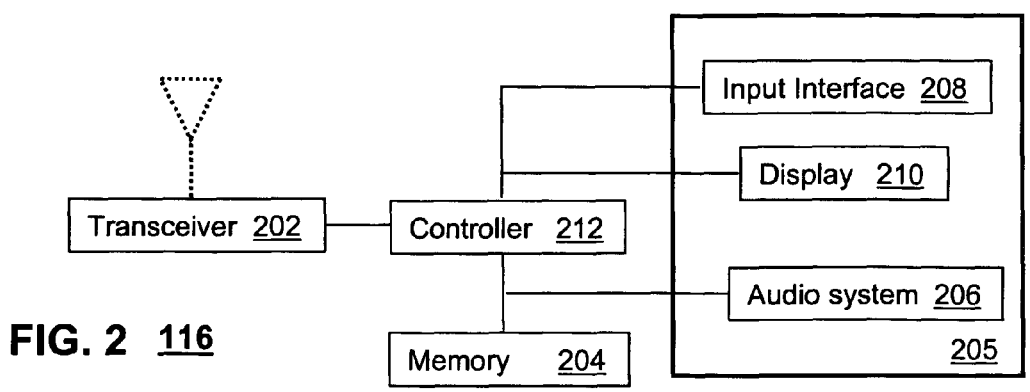
FIG. 2 is a block diagram of a mobile communication device (MCD) incorporating teachings of the present disclosure.

FIG. 2 is a block diagram of the MCD 116 incorporating teachings of the present disclosure. The MCD 116 utilizes technology such as a wireless transceiver 202, a memory 204, and user interface (UI) element 205 comprising at least one among an audio system 206, an input interface 208, and a display 210. The MCD 116 further includes a controller 212 for managing operations of the MCD. The wireless transceiver 202 utilizes common technology for exchanging voice and data messages with the base stations 107, which relay said messages to targeted end users.

In an embodiment where the MCD 116 is a multi-mode communication device, the wireless transceiver 202 can also include wireline communications such as POTS—Plain Old Telephone Service, and/or wireless communications such as Bluetooth™, infrared (IrDA), WiFi, WiMax, and so on. In this embodiment, the MCD 116 can also serve as terminal device 114 of the enterprise 105. That is, when the MCD 116 is within the premises of the enterprise 105 it can function as a POTS wireline or cordless device, or an IP-based device over Ethernet or WiFi supporting, for example, voice over Internet protocol (VoIP). When roaming outside the enterprise the MCD 116 can function as a wireless communication device on the external cellular network.

The controller 212 utilizes computing technology such as a microprocessor and/or digital signal processor for controlling the operations of the MCD 116 according to the present disclosure. The memory 204 comprises storage devices such as RAM, SRAM, DRAM, and/or Flash memories. The audio system 206 includes audio technology for intercepting audio signals from a user and for conveying audio signals received by the MCD 116. The input interface 208 can be a keypad with navigation and alphanumeric functionality accessible by an end user for manipulating graphical and textual presentations made on the display 210. The display 210 can utilize common technology such as a color thin film transistor liquid crystal display (TFT LCD).

It would be apparent to one of ordinary skill in the art that the communication technologies illustrated in FIG. 1 can be modified without departing from the scope and spirit of the claims described below. For instance, the cellular network 103 can be replaced with a WiFi or WiMax network without departing from the teachings of the present disclosure and the claims described herein.

Figure 3:
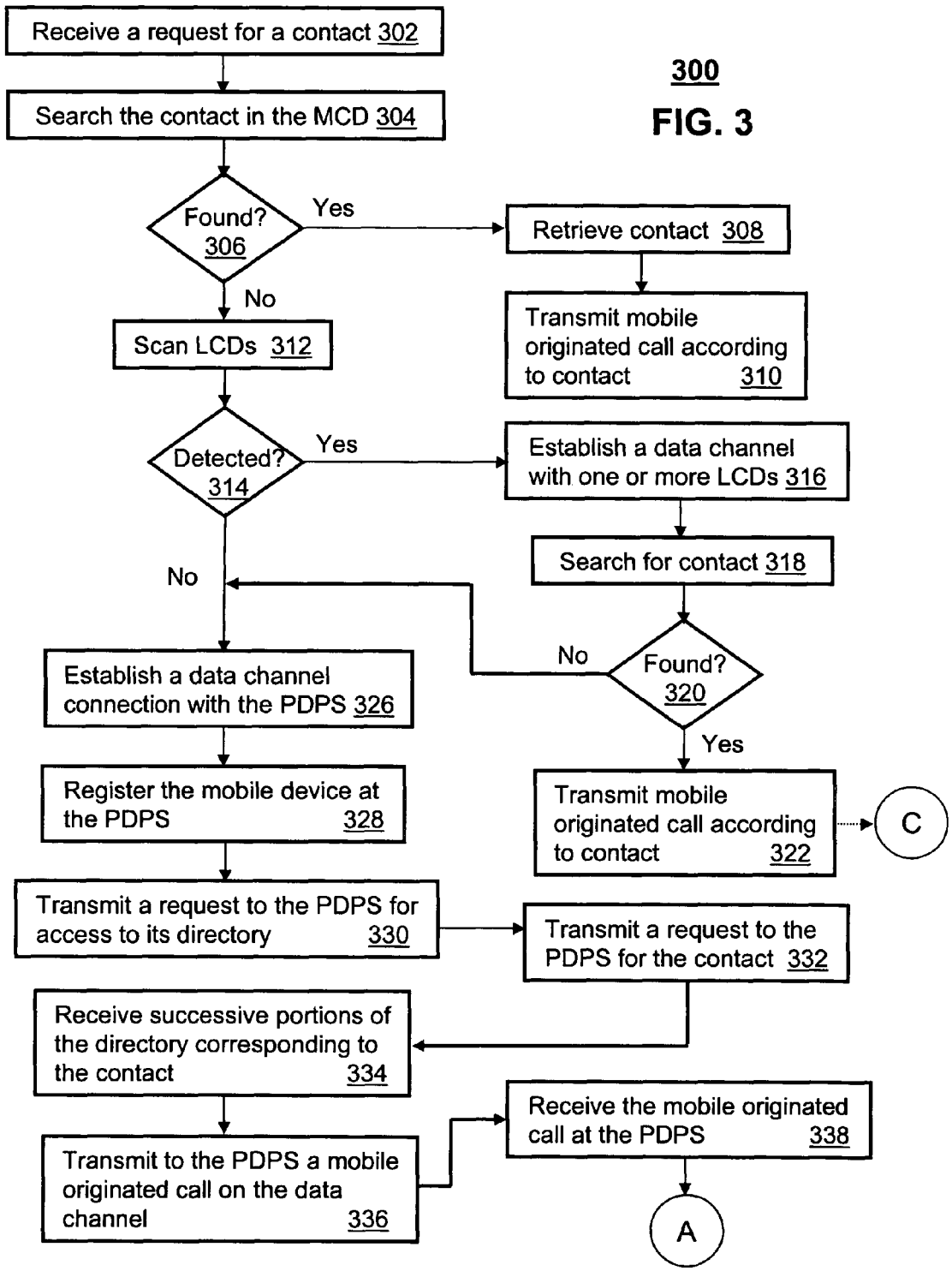
FIGS. 3-4 depict a flowchart of a method operating in the communication system according to teachings of the present disclosure.
Figure 4:
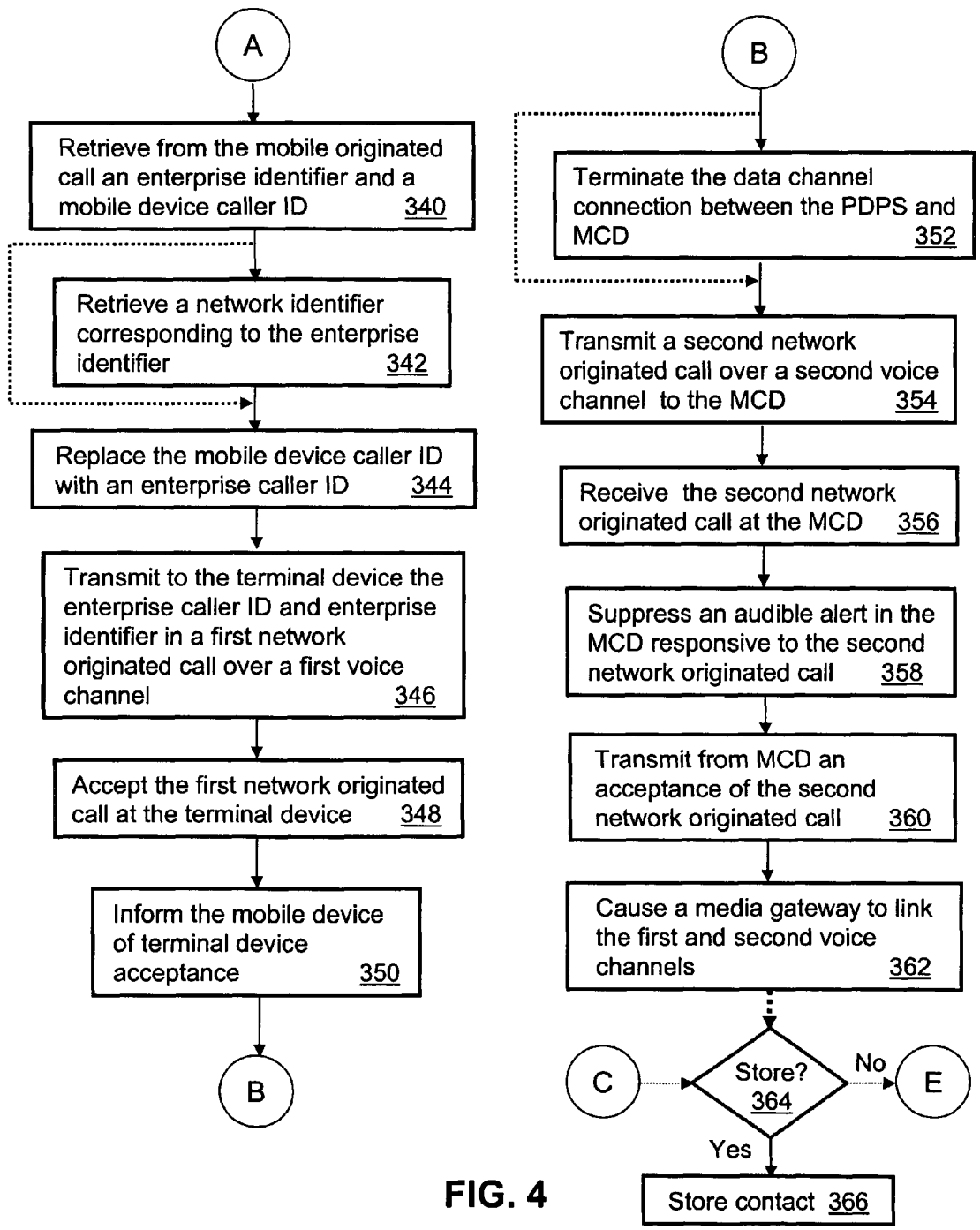

With this in mind, FIGS. 3-4 depict a flowchart of a method 300 operating in the communication system 100 according to the teachings of the present disclosure. Method 300 begins with step 302 where the MCD 116 receives a request for a contact. This step can represent, for instance, an end user entering at the input interface 208 the name of a specific individual or business contact. In step 304, the controller 212 of the MCD 116 can be programmed to search the contact in a phonebook stored in the MCD 116. The phonebook can store, for example, any form of contact information such as business, and personal contacts.

If in step 306 the controller 212 finds the requested contact, it proceeds to step 308 where it retrieves the contact from the phonebook. In step 310, the controller 212 can be programmed in supplemental embodiment to transmit a mobile originated call according to a select one of contact numbers associated with the selected contact (e.g., John Doe's home, business, or mobile). The mobile originated call can be on a circuit-switched voice channel of fixed base station 107. Alternatively, a mobile originated call can take place over a data channel directed to the PDPS 102 for VoIP communications as will be described in steps 336-362.

If, on the other hand, the contact requested cannot be found in the phonebook of the MCD 116, the controller 212 proceeds to step 312 where it scans by way of the wireless transceiver 202 for local communication devices (LCDs). An LCD can represent another cellular phone, PDA, laptop computer, or other communication device capable of storing a phonebook and communicating with the MCD 116. Thus, the transceiver 202 can be directed to scan for LCDs by way of cellular technology as described earlier, WiMax, or short range technologies such as IrDA, Bluetooth™, and/or WiFi. If one or more LCDs are detected in step 314, the controller 212 proceeds to step 316 where it establishes a data channel with the detected LCDs. In step 318 it searches for the contact at each detected LCD. If it finds one or more sources for the contact in step 320, the controller 212 can be programmed to proceed to step 322 to transmit a mobile originated call (much like in step 310) on the basis of a selectable portion of the contact selected by the end user of the MCD 116 by way of the UI 205.

From this step or upon termination of the mobile originated call, the controller 212 proceeds to step 364 where it determines if the end user is interested in storing the identified contact retrieved from the LCD. This step can be represented by a prompt conveyed by the UI 205 to the end user for choosing to save the contact in the MCD's phonebook. If the save option is selected, the controller 212 proceeds to step 366 where it stores in whole or in part the contact retrieved from the LCD as directed by the end user. If the end user does not select the save option, the controller 212 continues with it most current task.

If no LCDs are detected, or in step 320 the contact cannot be found, the controller 212 proceeds step 326 where it establishes a data channel connection (over, for example, GPRS, EDGE, CDMA-1X, UMTS etc.) with the PDPS 102. Upon establishing this connection, in step 328 the PDPS 102 registers the MCD 116. The registration process can include identifying the MCD 116 as a known user and extracting account information relating thereto from its database 106. The account information can indicate, for example, that the MCD 116 user is a member of enterprise 105. The database 106 can further include enterprise identifiers in the phone directory for conducting abbreviated dialing with personnel of the enterprise 105.

In step 330 the PDPS 102 receives a request from the MCD 116 to access its phone directory. From this step the MCD 116 can be presented, for example, a graphical "find screen" on the display 210 for searching individuals in the phone directory. For each search instance made by the end user of the MCD 116 by way of the input interface 208, a selective request is transmitted to the PDPS 102 corresponding to said search. The PDPS 102 in turn transmits to the MCD 116 in step 334 successive portions of the directory corresponding to the selective requests received.

Once the end user of the MCD 116 has selected by way of the input interface 208 a targeted individual to call, the MCD 116 transmits in step 336 to the PDPS 102 over the data channel details relating to a mobile originated (MO) call to establish connectivity with a terminal device 114 corresponding to the targeted individual. As part of the MO call, the MCD 116 can utilize a 10-digit number or an abbreviated enterprise identifier such as 6-5555 for the terminal device 114 as provided by the selectable portion of the directory presented on the display 210. As noted earlier, the terminal device 114 can be an enterprise user or a non-enterprise user. In either case the terminal device 114 can be any one of a variety of devices including, but not limited to, a POTS (Plain Old Telephone Service) phone, VoIP phone, wireless device, etc.

As just noted, step 336 can be in response to a user of the MCD 116 desiring to communicate with an enterprise user as if the mobile user were making the call within the enterprise 105 (i.e., his/her office). The PDPS 102 receives the MO call in step 338, and in step 340 (see FIG. 4) retrieves from the MO call the enterprise identifier and a MCD 116 caller ID. If the received enterprise identifier is a 10-digit number, the PDPS 102 skips over step 342 to step 344. Otherwise, the PDPS 102 proceeds to step 342 where it retrieves a network identifier comprising a 10-digit number (e.g., 333-444-5555) corresponding to the abbreviated enterprise identifier of 6-5555.

As a supplemental embodiment, in step 344 the PDPS 102 can replace the MCD 116 caller ID with an enterprise caller ID to emulate a caller ID originating from mobile user's office in the enterprise 105. In step 346, the PDPS 102 transmits a first network originated call to the targeted terminal device 114 with the enterprise caller ID using the network identifier (i.e., 333-444-5555). The first network originating call represents the initial step in establishing a voice call with terminal device 114 of an enterprise (or non-enterprise) user. When the terminal device 114 accepts the call in step 348, the PDPS 102 proceeds to step 350 where it informs the MCD 116 of the acceptance. Thereafter in step 352, the MCD 116 and the PDPS 102 terminate the data connection. If, however, the MCD 116 can support simultaneous voice and data connections, step 352 can be skipped, thereby providing the PDPS 102 and MCD 116 a means to exchange further information such as telemetry information, billing information, or otherwise.

In step 354, the PDPS 102 transmits a second network originated call over a second voice channel to the MCD 116 utilizing a signaling protocol such as SS7 (Signaling System 7). In step 356, the MCD 116 receives the second network originated call. The MCD 116 in step 358 suppresses an audible alert typically generated by the audio system 206 so as to not confuse the user of the MCD 116 who initiated the call. In step 360, the MCD 116 automatically informs the PDPS 102 that it has accepted the call. In step 362, the PDPS 102 calls upon the media gateway 109 to link the first and second voice channels by patching bearer sessions between the circuit-switched cellular network 103 and the VoIP terminal device 114 utilizing RTP (Real-time Transport Protocol) over the IP network 101 on link 111. At this point the mobile user and the targeted enterprise (or non-enterprise) user can conduct a conversation.

The aforementioned steps occur rapidly so that it would be imperceptible to either of the mobile and enterprise users that multiple calls sessions have taken place. Furthermore, the aforementioned steps can be implemented with computer instructions operating in part at the PDPS 102 and as a client in the MCD 116, respectively. It should also be noted that method 300 and its variants can be employed in portions of the communication system 100 of FIG. 1 with minimal impact to the suppliers of legacy technologies illustrated therein.

As noted earlier, the controller 212 proceeds to step 364 during or after termination of the mobile originated call. In this step the end user can be presented with to save the contact retrieved from the directory of the enterprise in the MCD's phonebook. If the save option is selected, the controller 212 proceeds to step 366 where it stores in whole or in part the contact retrieved from the LCD as directed by the end user. If the end user does not select the save option, the controller 212 continues with it most current task.

It should be emphasized that although the above description focuses on an enterprise setting, non-commercial settings are within the scope and spirit of the claims described below. It would be evident to an artisan with ordinary skill in the art that an exchange system such as a PBX or Centrex is an unnecessary element in view of the claims below. For example, the transactions described in method 300 can take place directly between the PDPS 102, the MCD 116, and the terminal device 114 without interaction with a private exchange, or other networking element so long as a communication medium interconnecting the PDPS 102, the MCD 116, and the terminal device 114 facilitates said transactions. It would also be evident to said artisan that the voice channels described in the present disclosure can be IP-based voice channels, non-IP-based voice channels (such as circuit switched communications), or combinations thereof.

Figure 5:
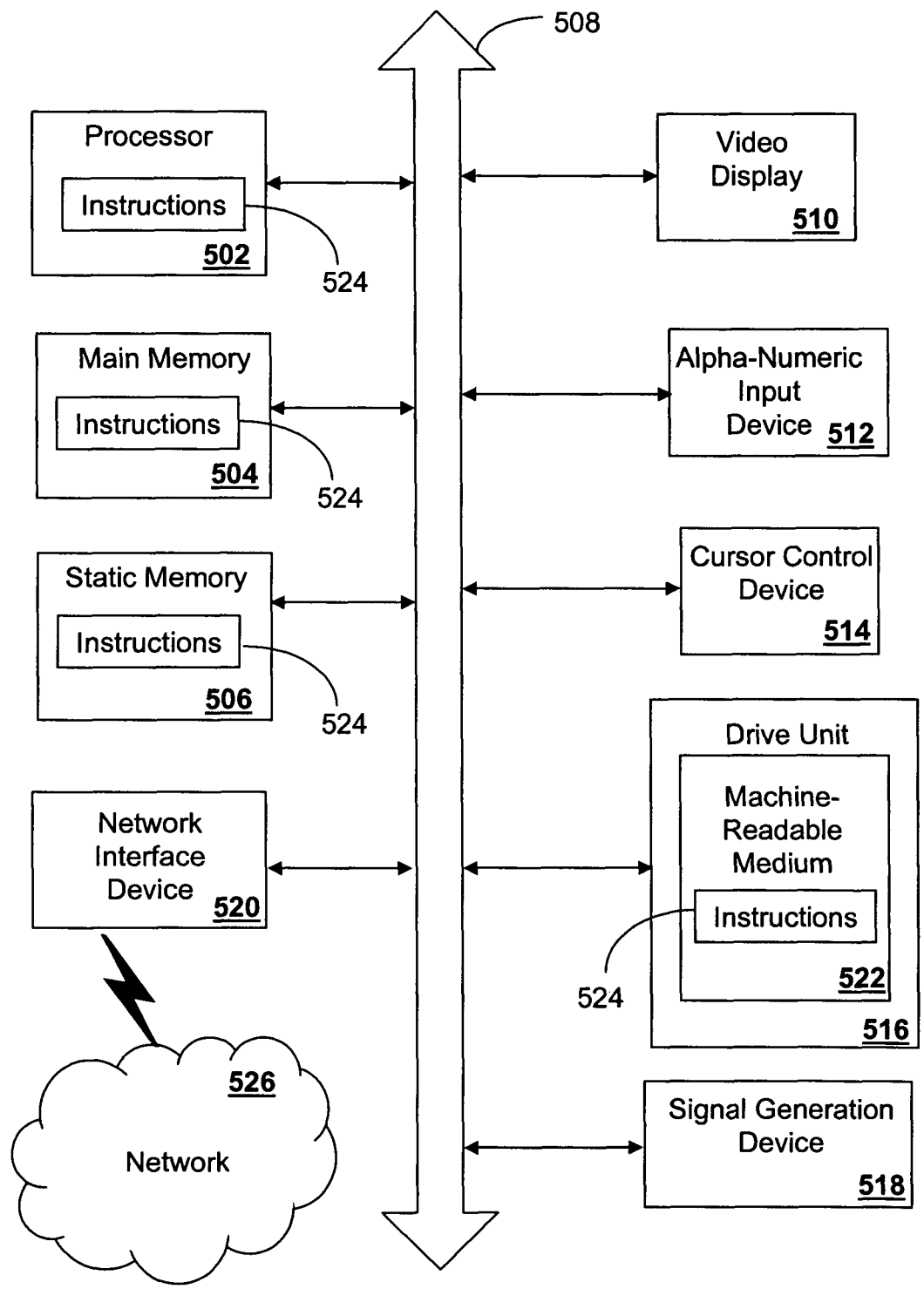
FIG. 5 is a diagrammatic representation of a machine in the form of a computer system within which a set of instructions, when executed, may cause the machine to perform any one or more of the methodologies discussed herein.

FIG. 5 is a diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage device comprising instructions which, responsive to being executed by a processor, cause the processor to perform operations comprising:
   searching a phone number in a phonebook of a mobile communication device responsive to a request to initiate a mobile originated call from the mobile communication device;
   if the phone number cannot be found in the phonebook of the mobile communication device:
      scanning for a wireless local communication device comprising a phonebook;
      detecting, when available, the local communication device;

responsive to succeeding in the detecting of the local communication device:
  searching for the phone number in the phonebook of the local communication device;
  responsive to finding the phone number in the local communication device, retrieving the phone number from the local communication device responsive to a selection and initiating a mobile originated call corresponding to the phone number without storing the phone number in the phonebook of the mobile communication device; and
  responsive in failing to find the phone number in the local communication device, requesting service from a phonebook directory proxy server;
responsive to failing in the detecting of the local communication device, requesting service from the phonebook directory proxy server; and
retrieving the phone number from the phonebook directory proxy server;
transmitting details, including a caller identification of the mobile communication device and an enterprise identification of the mobile communication device, to establish connectivity with a terminal device corresponding to the phone number,
wherein transmitting the details causes the phonebook directory proxy server to determine if the enterprise identification of the mobile communication device is an abbreviated-length phone number, and responsive to the caller identification being the abbreviated-length phone number, retrieving a full-length network identification comprising a full-length phone number corresponding to the abbreviated-length phone number as the enterprise identification;
wherein transmitting the details causes the phonebook proxy server to replace the caller identification of the mobile communication device with a corresponding caller identification that emulates the enterprise identification as if the mobile originated call originated from within the enterprise when the mobile communication device is not located within a vicinity of the enterprise, to transmit a first network originated call to the terminal device over a first voice channel, to transmit a second network originated call to the mobile communication device over a second voice channel, and to link the first and second voice channels,
wherein the first network originated call is over a packet-switched network, and
wherein the second network originated call is over a circuit-switched network.

2. The machine-readable storage device of claim 1, wherein the operations further comprise:
establishing a data channel with the phonebook directory proxy server;
transmitting on the data channel a request for access to the directory;
transmitting to the phonebook directory proxy server a request for the phone number; and
receiving from the phonebook directory proxy server a successive portion of the directory corresponding to the phone number requested.

3. The machine-readable storage device of claim 2, wherein the operations further comprise:
transmitting to the phonebook directory proxy server on the data channel a mobile originated call corresponding to the phone number to establish voice connectivity with a terminal device.

4. The machine-readable storage device of claim 3, wherein the operations further comprise suppressing an audible alert responsive to the network originated call.

5. The machine-readable storage device of claim 3, wherein the operations further comprise:
receiving an acknowledgment from the phonebook directory proxy server corresponding to a voice channel connection with the terminal device; and
terminating the connection to the data channel.

6. The machine-readable storage device of claim 3, wherein the operations further comprise:
displaying the successive portion of the directory at the mobile communication device;
receiving an identifier selected from the successive portion of the directory; and
transmitting in the mobile originated call an abbreviated third party identifier corresponding to the identifier for identifying the terminal device.

7. A mobile communication device, comprising:
a transceiver;
a memory to store instructions; and
a controller comprising a processor in communication with the memory, wherein the processor, responsive to executing the instructions performs operations comprising:
  receiving a request for a phone number to initiate a mobile originated call;
  searching for the phone number in a phonebook of the mobile communication device in response to the request for the phone number to initiate the mobile originated call;
  if an entry cannot be found in the mobile communication device:
    detecting over a wireless medium presence of a local communication device comprising a phonebook;
    responsive to the detecting of the local communication device:
      communicatively coupling to the local communication device over a data channel of the wireless medium;
      searching for the phone number in the phonebook of the local communication device;
      responsive to the searching succeeding in finding the phone number in the local communication device, retrieving the phone number from the local communication device responsive to a selection and initiating the mobile originated call corresponding to the phone number without storing the phone number in the phonebook of the mobile communication device;
      responsive to the searching failing in finding the phone number in the local communication device, searching for the phone number in a phonebook directory of an enterprise server; and
    responsive to failing in detecting a local communication device, searching for the phone number in a phonebook directory of an enterprise server;
  responsive to locating the phone number in the phonebook directory of the enterprise server, transmitting details, including a caller identification of the mobile communication device and an enterprise identification of the mobile communication device, to establish connectivity, by way of a phonebook director proxy server, with a terminal device corresponding to the phone number,
  wherein transmitting the details causes the phonebook directory proxy server to determine if the enterprise identification of the mobile communication device is an abbreviated-length phone number, and responsive to the caller identification being the abbreviated-length phone number, retrieving a full-length network identification comprising a full-length phone number corresponding to the abbreviated-length phone number as the enterprise identification,
  wherein transmitting the details causes the phonebook proxy server to replace the caller identification of the mobile communication device with a corresponding caller identification that emulates the enterprise identification as if the mobile originated call originated from within the enterprise when the mobile communication device is not located within a vicinity of the enterprise, to transmit a first network originated call to the terminal device over a first voice channel, to transmit a second network originated call to the mobile communication device over a second voice channel, and to link the first and second voice channels,
  wherein the first network originated call is over a packet-switched network, and
  wherein the second network originated call is over a circuit-switched network.

8. The mobile communication device of claim 7, wherein the operations further comprise:
  searching for the local communication device;
  detecting the local communication device;
  establishing a data channel connection with the local communication device;
  detecting the phone number in the phonebook of the local communication device; and
  retrieving the phone number from the local communication device.

9. The mobile communication device of claim 7, wherein the operations further comprise:
  searching for the enterprise server;
  detecting the enterprise server;
  establishing a data channel connection with the enterprise server;
  detecting the phone number in the directory of the enterprise server; and
  retrieving the phone number from the enterprise server.

10. The mobile communication device of claim 7, wherein the operations further comprise initiating the mobile originated call to a fixed base station corresponding to the phone number.

11. The mobile communication device of claim 7, wherein the enterprise server comprises a phonebook directory proxy server, and wherein the operations further comprise:
  establishing a data channel connection with the phonebook directory proxy server;
  transmitting on the data channel a request for access to a directory of the phonebook directory proxy server;
  transmitting to the phonebook directory proxy server a request for the phone number; and
  receiving from the phonebook directory proxy server a successive portion of the directory corresponding to the phone number requested.

12. The mobile communication device of claim 11, wherein the operations further comprise transmitting to the phonebook directory proxy server a registration request on the data channel.

13. The mobile communication device of claim 11, wherein the operations further comprise transmitting to the phonebook directory proxy server on the data channel a mobile originated call corresponding to the phone number to establish voice connectivity with a terminal device.

14. The mobile communication device of claim 13, further comprising an audio system, wherein the operations further comprise suppressing an audible alert responsive to the network originated call.

15. The mobile communication device of claim 13, wherein the operations further comprise:
  receiving an acknowledgment from the phonebook directory proxy server corresponding to an accepted voice channel connection with the terminal device; and
  terminating the connection to the data channel.

16. The mobile communication device of claim 13, comprising a user interface, wherein the operations further comprise:
  presenting the successive portion of the directory at the mobile communication device;
  receiving an identifier selected from the successive portion of the directory; and
  transmitting in the mobile originated call an abbreviated third party identifier corresponding to the identifier for identifying the terminal device.

17. A method, comprising:
  searching, by a system comprising a processor, a phone number in a phonebook of a mobile communication device in response to a request to initiate a mobile originated call from the mobile communication device to the phone number;
  if the phone number cannot be found in the phonebook of the mobile communication device:
    detecting, by the system, a local communication device comprising a phonebook, when available;
    responsive to succeeding in the detecting of the local communication device:
      searching, by the system, for the phone number in the phonebook of the local communication device;
      in response to succeeding to find the phone number in the local communication device, retrieving the phone number from the local communication device; and
      in response to failing to find the phone number in the local communication device, contacting, by the system, a phonebook directory proxy server;
    responsive to failing in the detecting of the local communications device, contacting, by the system, the phonebook proxy server;
    searching, by the system, the phone number in a phonebook directory of the phonebook directory proxy server;
    finding, by the system, the phone number in the phonebook directory;
    retrieving, by the system, the phone number from the phonebook directory;
    initiating, by the system, a mobile originated call corresponding to the phone number without storing the phone number in the phonebook of the mobile communication device; and
    at the phonebook directory proxy server, receiving from the mobile communication device on a data channel the mobile originated call comprising a caller identification of the mobile communication device according to the phone number for connecting to a terminal device and an enterprise identification of the mobile communication device;
    determining if the enterprise identification of the mobile communication device is an abbreviated-length phone number, and responsive to the caller identification being the abbreviated-length phone number, retrieving a full-length network identification comprising a full-length phone number corresponding to the abbreviated-length phone number as the enterprise identification;

replacing the caller identification of the mobile communication device with a corresponding caller identification that emulates the enterprise identification as if the mobile originated call originated from within the enterprise when the mobile communication device is not located within a vicinity of the enterprise;

transmitting, by the system, a first network originated call to the terminal device over a first voice channel;

transmitting, by the system, a second network originated call to the mobile communication device over a second voice channel, wherein the first network originated call is over a packet-switched network, and wherein the second network originated call is over a circuit-switched network; and causing, by the system, the first and second voice channels to be linked.

18. The method of claim 17, comprising at the mobile communication device, suppressing, by the system, an audible alert responsive to the second network originated call, wherein the first and second voice channels are linked using a media gateway.

19. The method of claim 18, comprising:
at the mobile communication device,
   transmitting, by the system, in the mobile originated call an abbreviated third party identifier corresponding to an identifier selected from the phone number;
at the phonebook directory proxy server; and
   transmitting, by the system, the first network originated call according to the abbreviated third party identifier and the caller identification.

* * * * *